United States Patent [19]

Weiss et al.

[11] Patent Number: 5,115,976
[45] Date of Patent: May 26, 1992

[54] LIGHTWEIGHT, EASILY ATTACHABLE DISPENSING DEVICE HAVING INTERCHANGEABLE CONTAINERS FOR HOLDING A CHEMICAL TO BE DISPENSED

[75] Inventors: Lon L. Weiss, Fresno, Calif.; Larry R. Jacobson, Midland, Mich.; Frank S. Rankin, Fresno, Calif.

[73] Assignee: Dow Corning Corporation, Midland, Mich.

[21] Appl. No.: 614,301

[22] Filed: Nov. 16, 1990

[51] Int. Cl.$^5$ .............................................. A61L 9/04
[52] U.S. Cl. ........................................ 239/57; 239/60; 206/0.5
[58] Field of Search .................. 239/34, 36, 53-55, 239/57, 60; 206/0.5, 820; 222/3

[56] References Cited

U.S. PATENT DOCUMENTS

| D. 244,775 | 6/1977 | Wilson | 239/57 |
|---|---|---|---|
| 2,103,609 | 12/1937 | Bradburn | 239/54 |
| 2,671,688 | 3/1954 | Conner | 299/24 |
| 2,755,954 | 7/1956 | Antritter | 239/57 |
| 3,552,632 | 1/1971 | Wilson | 229/30 |
| 3,613,994 | 10/1971 | Goodman | 206/0.5 |
| 3,784,102 | 1/1974 | Stults | 239/57 |
| 4,017,030 | 4/1977 | Coplan et al. | 239/44 |
| 4,220,281 | 9/1980 | Martens et al. | 239/57 |
| 4,605,123 | 8/1986 | Goodrum et al. | 206/0.5 |
| 4,802,626 | 2/1989 | Forbes et al. | 239/36 |
| 4,813,174 | 3/1989 | Cook | 206/0.5 |
| 4,871,555 | 10/1989 | Schwartz et al. | 426/82 |

FOREIGN PATENT DOCUMENTS 1316894  3/1962  France .................................. 239/60

Primary Examiner—Andres Kashnikow
Assistant Examiner—Lesley D. Morris
Attorney, Agent, or Firm—Eckert, Seamans, Cherin & Mellott

[57] ABSTRACT

A dispenser for agricultural chemicals generally has a small plastic plate defining an affixing enclosure for fitting the dispenser over or around branches, vines etc. The plate has an opening therein. A container for the chemicals having one unenclosed section is attachable to the plate with the unenclosed section substantially aligned with the opening in the plate for emitting the agricultural chemicals to the environment. The opening in the faceplate can be at least partially surrounded by a raised edge and this edge may contain a lip for securing the container to the plate via a snap or sliding fit. Certain other options include forming the faceplate with small nubs which jut outwards over the opening in the faceplate. When the container is attached to the plate, these nubs prevent the chemical within the container from being jostled loose and also limit the exposed surface area of the contained chemical. Variously sized containers are attachable to the plate to selectively choose the rate of diffusion of the chemical through selection of effective surface area exposure.

21 Claims, 4 Drawing Sheets

LIGHTWEIGHT, EASILY ATTACHABLE DISPENSING DEVICE HAVING INTERCHANGEABLE CONTAINERS FOR HOLDING A CHEMICAL TO BE DISPENSED

BACKGROUND OF THE INVENTION

1. Field of the Invention

This invention relates to regulating dispensers for controlled release polymers containing agricultural chemicals and the like. The invention particularly relates to surface area regulating dispensers wherein the exposed surface area of the polymer to be released can be regulated by choice of elements included in a standardized dispenser.

2. Prior Art

Devices for containing and releasing volatile vapors from a solid or the like are known in the art. The U.S. Pat. No. 2,671,688 (Conner), discloses, for example, a device for evolving vapors to the air. In Conner, the solid which is to evolve into the nearby air is sufficiently large to contain a hook embedded therein. The hook is used to hang the device from a closet rod or the like. The exposed surface area of the solid is entirely dependent upon its size as manufactured. The release rate of volatile vapors is a function of the extent of surface area exposure of the solid to the surrounding air.

U.S. Pat. No. 3,552,632 (Wilson), demonstrates that it is known to make boxed shape dispensers having openings for exposing air-refreshening materials contained therein to the air. The dispenser has an essentially solid hanger member having an aperture therethrough for mounting the dispenser over a nail or the like. In such a device the air within the dispenser becomes saturated. Accordingly, the dimensions of the openings control the rate at which the volatile material diffuses into the air.

It is also known from U.S. Pat. No. 4,017,030 (Coplan et al) to provide a device for dissemination of a vaporizable material at a predetermined rate using elongated capillary conduits of predetermined cross-sectional area for containing the vaporizable substance therein.

It is known from U.S. Pat. No. 4,220,281 (Martens III et al) to provide a vapor dispensing device in substantially a box shape wherein a carrier material impregnated with or coated by a vaporizable air treating composition is disposed inside the box. The rate of vaporization is controlled through the use of means to cover or uncover openings in the box walls.

It is also known from U.S. Pat. No. 4,813,174 (Cook), to provide a basket shaped container for holding a scented lure within an insect trap. The basket is formed of spaced apart webs and has a lid extending over its top to confine the lure. A tab extending from the peripheral edge of the basket is used to secure the basket within the trap.

It is also known from U.S. Pat. Nos. 4,605,123 (Goodrum et al), and 4,871,555 (Schwartz et al) to provide infusion devices that are placeable in a liquid and contain matter which is to be diffused into the liquid. The above listed art does not encompass small easily attachable dispensers having varyingly sized and interchangeable substance containers. The art likewise does not disclose proper means for attaching a vapor dispensing device to a variety of objects.

Therefore, there is a need to provide small regulating dispensers that are easily attached to a variety of natural and man-made structures. There is a further need to provide these dispensers with means for varying the exposed surface area of the dispensed material and for rapidly accomplishing this variation.

SUMMARY OF THE INVENTION

It is a general object of this invention to provide a dispenser for agricultural chemicals.

It is an object of this invention to provide a dispenser for agricultural chemicals wherein the extent of exposed surface area of the chemicals can be varied to at least two different release conditions.

Another object of the invention is to provide a dispenser for agricultural chemicals which can be easily relocated.

Another object of the invention is to provide a dispenser for agricultural chemicals which is flexible in terms of the quantity and type of chemicals dispensed.

A further object of the invention is to provide a dispenser for agricultural chemicals which can be manufactured in distinct shapes and/or colors depending upon the insect to be attracted and/or the chemical to be contained, etc.

In the accomplishment of these objects, a small lightweight device is provided. The device consists of two parts: a container and a faceplate. The faceplate is generally a small, flat piece and is preferably constructed of light weight durable material such as plastic. One end of the faceplate is generally open to define an aperture for attaching the faceplate to a vine, branch or the like. The body structure surrounding the aperture is preferably discontinuous to define, for instance, a web to aid in the attachment. The opposite end of the faceplate has a hole therein. This hole is surrounded by a raised edge. The container is made to fit in concentric alignment with the hole. The container and the faceplate can be attachable by a raised edge on the faceplate engageable by the container so that a form-fit is achieved, or by outfitting each with a lip for snap fitting the container to the faceplate. Containers of various sizes, each having the same upper lip or upper edge dimensions for fitting a standard faceplate, are made available. This allows for simple and rapid replacement of containers within face plates. Containers of larger dimensions effectively expose more of the contained agricultural substance to the air than those of smaller dimensions and consequently diffuse the substance at a faster rate. This becomes important because release rates of pheromones and insect attractants must be regulated in a range to which the insect responds. Rates different than a nominal rate are either wasteful or ineffective to influence insect behavior. Containers, and of course the receiving raised edges of the faceplate, can be made in various geometric shapes. The faceplate and/or container can be made from different colored plastics for both coding purposes such as date of application, product variations and to take advantage of the attraction of certain insects to certain colors.

The above-listed preferred aspects are not intended as limiting. For instance, the faceplate can be constructed with an additional hole for introduction of a nail or tie wrap therethrough for use in more securely attaching the device to an object. Additionally, the faceplate can be constructed of a greater lengthwise dimension with additional holes therethrough for attaching a plurality of containers in varying or similar sizes for use in evolving or diffusing combinations of agricultural chemicals to the environment. It is also preferable to construct the faceplate with small nubs of plastic, integral to the faceplate itself, jutting slightly outwards over the hole in the faceplate where the container is to be attached. This serves the dual purpose of preventing solid form chemicals within the container from being jarred out upon movement of the device and as a further limitation of exposed chemical surface area.

DETAILED DESCRIPTION OF THE INVENTION

Figure 2:
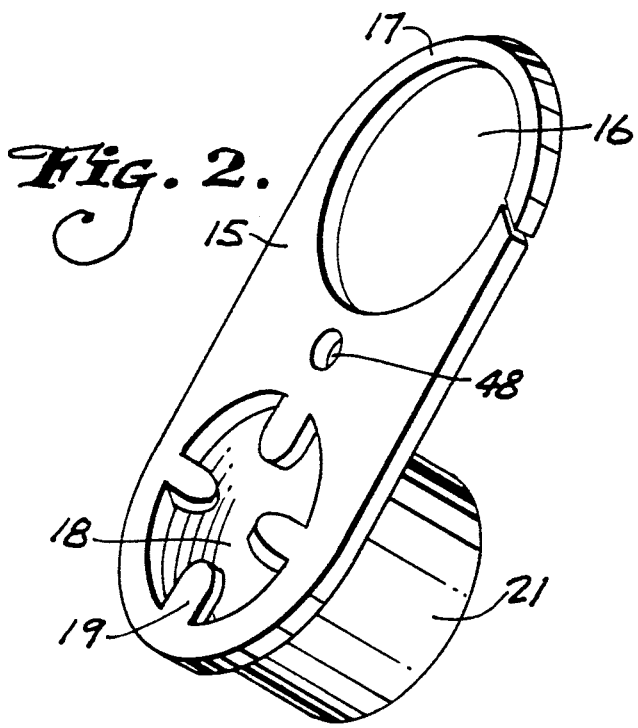
FIG. 2 is a top perspective view of a substantially oval faceplate and container according to FIG. 1.
Figure 3:
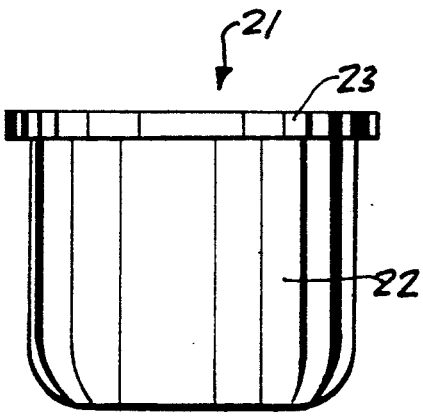
FIG. 3 is a side view of a container to be attached to the faceplate, the container having a cylindrical shape.
Figure 4:
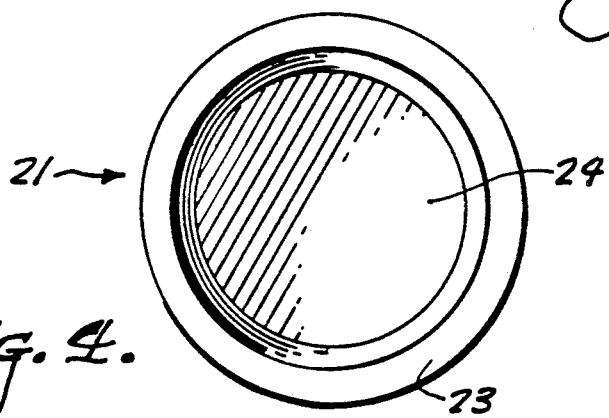
FIG. 4 is a top view of the cylindrically shaped container.

As shown in FIGS. 2, 3 and 4, the invention is a surface area dispenser including a faceplate 15 having an affixing section 16 and a dispensing section, the affixing section being defined by an affixing enclosure 17, the dispensing section having a hole 18 therein, a container 21 having an enclosed body 22 with at least one open section 24, and means for attaching the container 21 to the faceplate 15 wherein said open section 24 of the container 21 is substantially in alignment with the hole 18 in the dispensing section.

Figure 1:
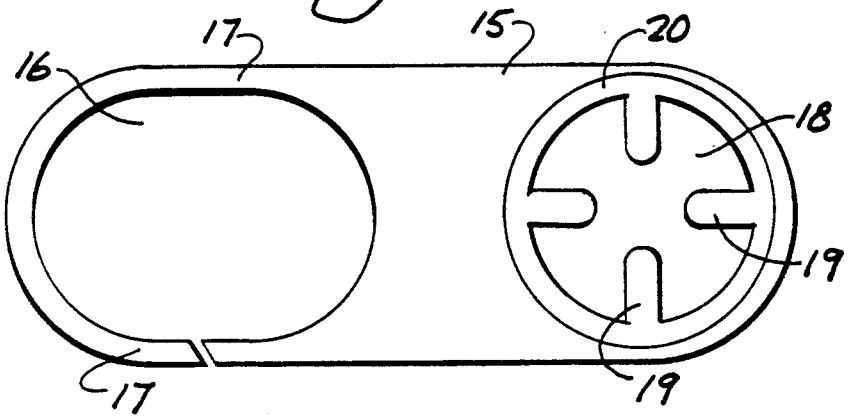
FIG. 1 is a bottom view of a substantially oval faceplate according to the invention.

The underside of a faceplate 15 having an essentially oval shape is shown in FIG. 1. The affixing section 16 is shown to be an opening in the faceplate body that is defined by an affixing enclosure 17. The device can be deployed in the environment by affixing it to a branch, vine or the like, for example, by threading said branch or vine through the affixing section 16. The affixing enclosure 17 can be defined by a discontinuous web, as shown in FIG. 1, to aid in affixing the device to a variety of objects which may be encountered in the field but not readily threaded through a hole defined by a continuous web. The discontinuous web can be designed to attach to itself, thus closing the web, therefore further securing the device to a branch, vine or the like. The dispensing section of faceplate 15 is shown to be essentially comprised of means defining a hole 19. A preferred embodiment of the device includes a faceplate 15 having stubs 19 which project outwards over hole 18 in the plane of faceplate 15. Stubs 19 serve the dual purpose of preventing any emitting body from being jostled out of the dispensing section and also as a further limitation on the extent of exposed surface area. The stubs 19 can be short and/or resilient enough to allow a body of scent emitting material to be pressed through hole 18.

Raised edge 20 is shown to completely encircle hole 18 in the dispensing section. Raised edge 20 preferably is manufactured to a tight tolerance so as to produce a form-fit with container 21 (not shown in FIG. 1) or may be produced with a lip so that a snap fit with container 21 is achieved. The edge can also be made discontinuous, for example by spaced sections together defining a lip for engaging the container.

It must kept in mind that the faceplate 15 shown and described in FIG. 1 is but one embodiment of a faceplate within the realm of the invention as disclosed and claimed. Other configurations are possible, for instance the faceplate 15 is not necessarily an elongated or oval shape as shown, but may be rectangular or some other geometric form. Likewise, hole 18 is not necessarily round and may be, for example, of triangular or rectangular cross-section. As a further limitation and control on the exposure of the emitting body surface area, hole 18 can vary in size independent of the size of any attached container 21 (not shown in FIG. 1). Altering varying sized containers 21 with faceplates 15 having differently sized openings 18 provides for proper selection of advantageous release rates. Also, affixing enclosure 17 is shown to have a small break therein, defining a form of hook, but this is not limiting and the affixing enclosure can, within the scope of this invention, be unbroken, have a larger break, or have means by which it is attachable to itself.

FIG. 2, which illustrates the top surface of the faceplate in perspective, shows and depicts similar features as discussed with respect to FIG. 1. In FIG. 2, container 21 is shown affixed to face plate 15. An alternate affixing device such as wire or a nail can be introduced through aperture 48 as a replacement or assistance for affixing enclosure 17.

FIG. 3 is a side view of the container 21. The container body 22 as shown can form a substantially complete enclosure, but for an open top edge at which the container 21 attaches to faceplate 15 (not shown in FIG. 3). The top of container body 22 preferably is manufactured with rim 23, namely a radially protruding flange that can be received by a lip on faceplate 15 (not shown in FIG. 3). Body 22 of container 21 is of any number of sizes to provide individually attachable containers 21 of varying cross-sectional area and/or volume.

Referring to FIG. 4, container 21 is again shown. However, FIG. 4 represents a top view of container 21 wherein unenclosed section 24 is clearly visible. Container rim 23 is shown encircling the top of container 21.

Figure 5:
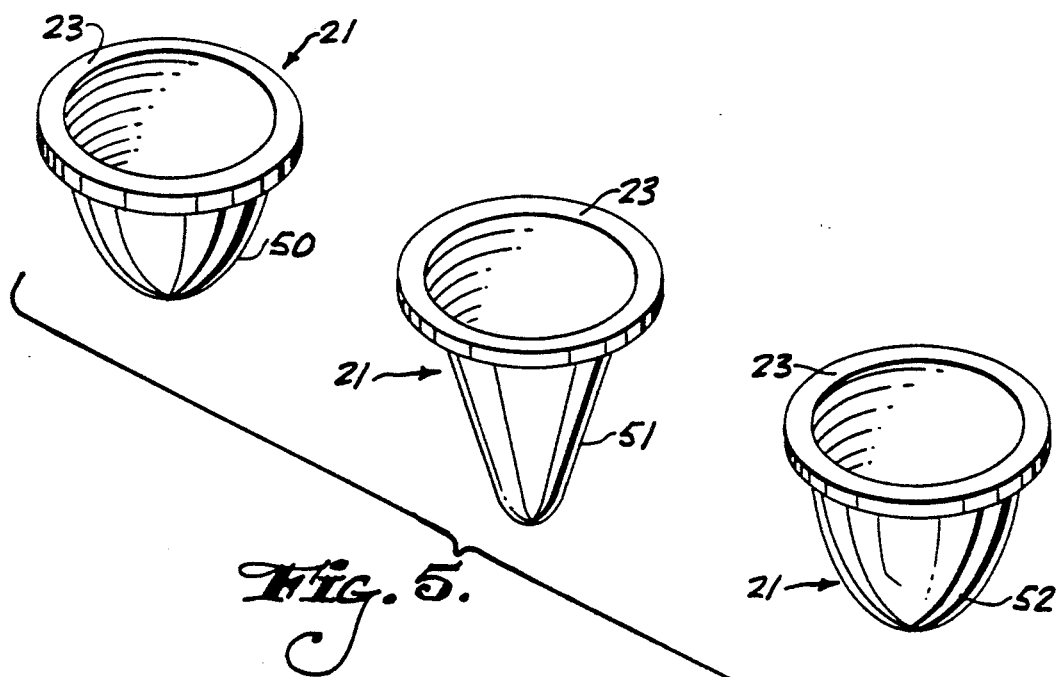
FIG. 5 is a perspective view of three alternate container shapes.
Figure 14:
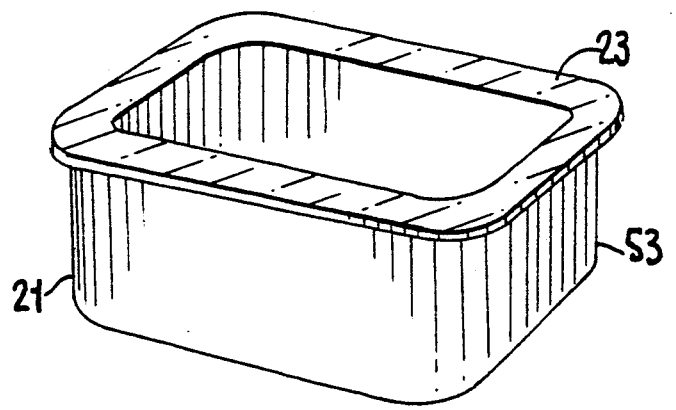
FIG. 14 is a perspective view of a rectangular shaped container.

Referencing FIG. 5 and FIG. 14 container 21 is depicted in perspective showing a number of possible shapes usable in accordance with the invention. Hemispherical container body 50, conical container body 51, ovoid container body 52 and rectangular container body 53 provide for varying degrees of polymer surface area exposure to satisfactorily control release rates. Each container body 50, 51, 52, and 53 has rim 23 to aid in affixation to faceplate 15 (not shown in FIGS. 4 and 14).

Figure 6:
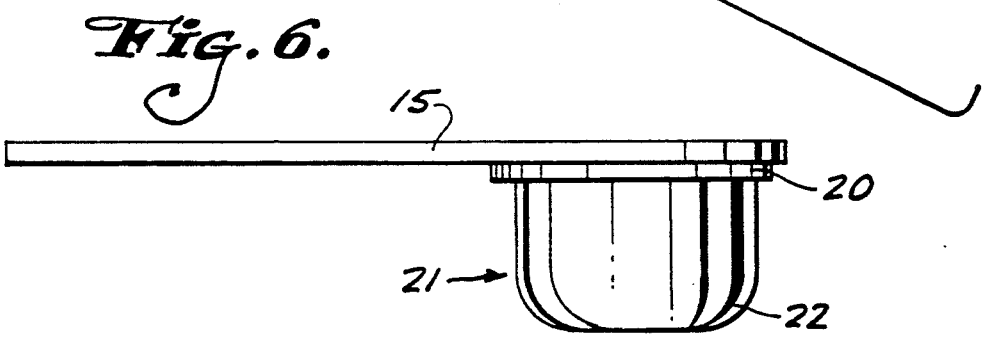
FIG. 6 is a side view of the device wherein the container is shown attached to the bottom of the faceplate.
Figure 9:
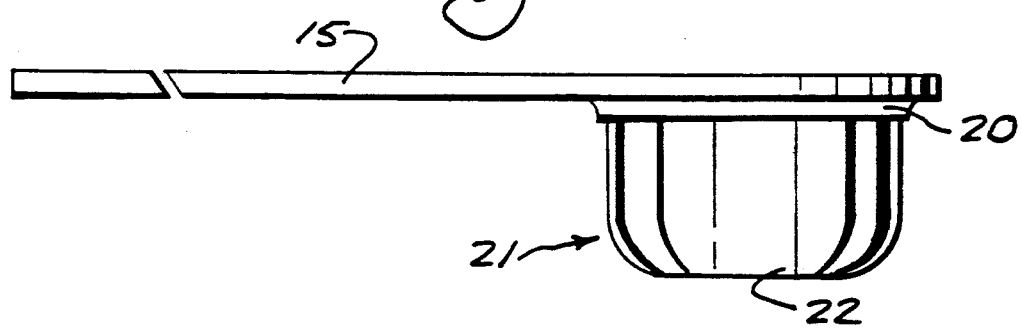
FIG. 9 is a side view of the device wherein the container is shown attached to the bottom of the faceplate via a form-fit.

Now referring to FIG. 6, a side view of the dispenser is shown. Container 21 is shown attached to faceplate 15. Such attachment is shown to be by way of a snap fit between rim 23 (not shown) and raised edge 20. Such means of attachment is not limiting. For instance, raised edge 20 and container body 22 can be manufactured to such tight tolerances that a form-fit is achieved between raised edge 20 and container body 22. A fit of this type is shown in FIG. 9. Note that in FIG. 9 it is not necessary to construct container 21 with rim 23 although inclusion of such would not inhibit attachment of the container via a form fit.

Figure 7:
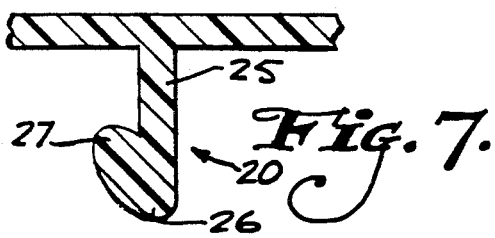
FIG. 7 is a cut-away view of the raised edge section of the faceplate where the container is attached.

FIG. 7 depicts a side view partial cross-section of raised edge 20 that can be used for accomplishing a snap fit with container 21 (not shown in FIG. 7). Raised edge 20 as shown has top 25 and bottom 26. Bottom 26 extends further inwardly than top 25, for example being thicker than top 25, whereby a lip 27 is defined.

Figure 8:
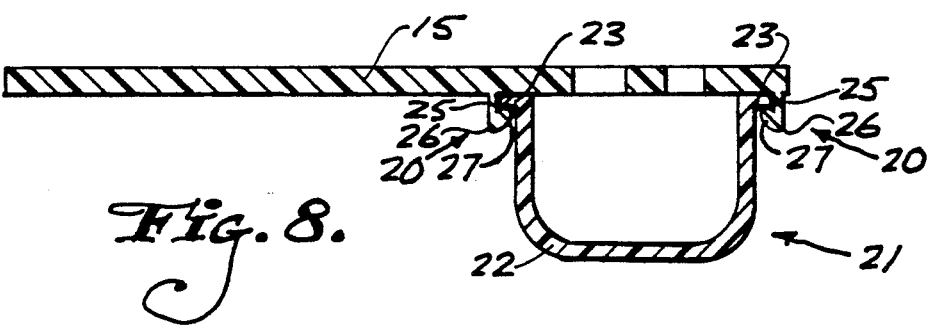
FIG. 8 is a side cut-away view showing the lip of the container engaged with the lip of the raised edge defining a snap-fit.

Referencing FIG. 8, in order to effect attachment of container 21 to faceplate 15, the container body 22 can be forced against bottom 26 of raised edge 20. Raised edge 20 deforms outwardly somewhat, allowing container rim 23 to pass over lip 27 of raised edge 20, which snaps back inwardly, the rim 23 resting securely against faceplate 15 and top 25 of raised edge 20. In this manner, lip 27 of raised edge 20 secures container 21 to faceplate 15. It can also be seen from FIG. 8 and also FIGS. 12 and 13, that a slide fit is achievable by constructing raised edge 20 as a discontinuous receptacle having an opening for laterally sliding container 21 into engagement with raised edge 20. In this manner, lips 27 of raised edge 20 form tracks for slidingly engaging rim 23 of container 21.

Figure 12:
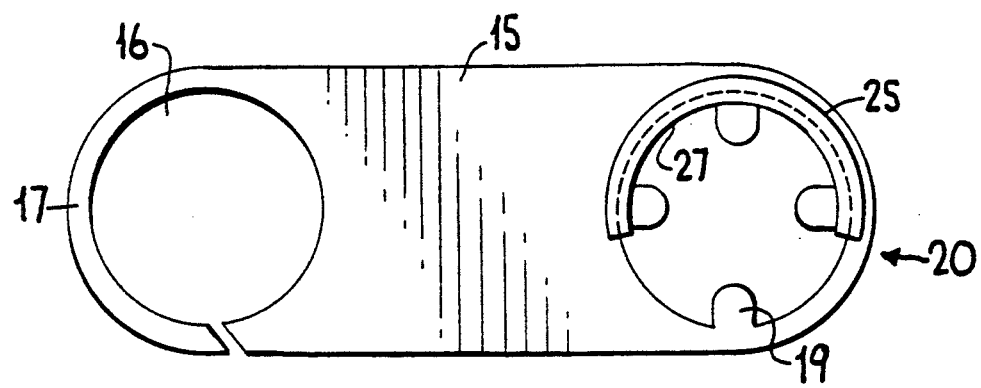
FIG. 12 is a bottom view of the device having a cut-away lip for achieving a slide-fit between the faceplate and the container.

As shown in FIG. 12, it is preferable to provide lips 27 and raised edge 20 that define a circular radius of just over 180° whereby container 21 must be forcibly slid into raised edge 20 having lips 27. The provision of raised edge 20 having a radius just over 180° allows lips 27 to slightly envelop the rim 23 of container 21 whereby container 21 is relatively secured in place on faceplate 15.

Figure 13:
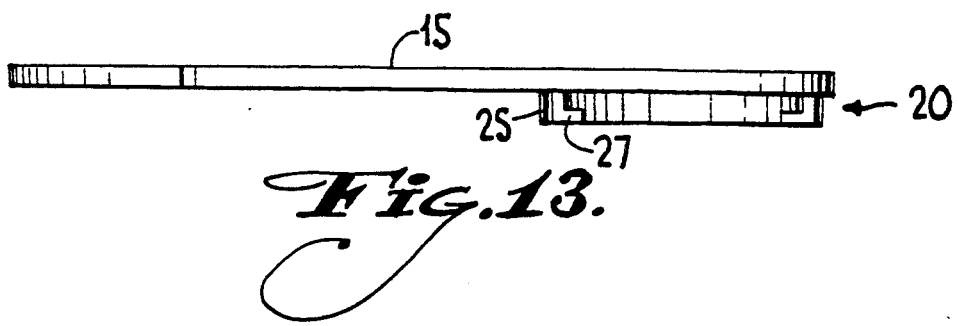
FIG. 13 is a side view of the device according to FIG. 12.

The side view of FIG. 13 depicts how lips 27 form tracks in raised edge 20 for sliding and securing a container in place.

The snap fit shown and described in FIGS. 7 and 8 is subject to some further variations. For instance, faceplate 15 may be constructed with a depression within faceplate 15 in place of raised edge 20. A lip may be made integral to this depression in faceplate 15 so that a snap fit can be made between the depression in faceplate 15 and rim 23 of container 21.

Figure 10:
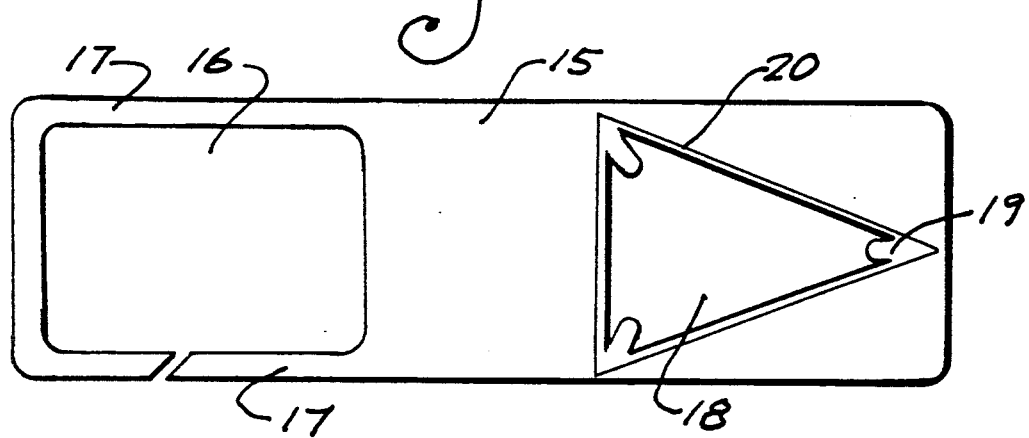
FIG. 10 is a bottom view of a rectangular faceplate having attachment structure for a triangular container.

FIG. 10 is a bottom view of the dispenser showing a rectangular faceplate 15, a triangular hole 18, and a triangular raised edge 20 for attaching a triangular container 21 (not shown) thereto.

Figure 11:
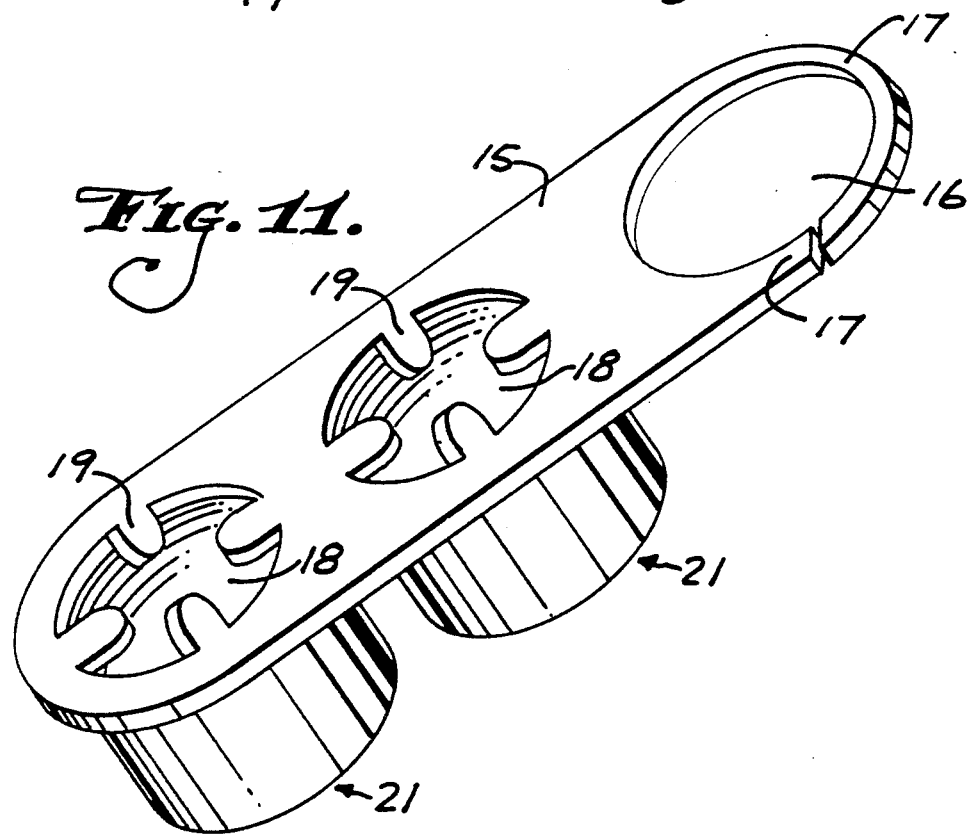
FIG. 11 is a top perspective view of a faceplate having a plurality of attached containers.

In FIG. 11, a perspective view of a dispenser having a dispensing section with a plurality of holes 18 therein for attaching a plurality of containers 21 thereto in substantial alignment with the plurality of holes 18. In this manner it is possible to release a combination of different polymers to the atmosphere without physically mixing them and potentially destroying their individual, unique properties.

Although some particular embodiments of the invention have been shown and described, various forms and embodiments of the device are possible within the scope of the invention claimed. For instance, it is assumed that affixing enclosure 17 will generally be used to affix the device to natural or man-made objects in the field, for example means disposing the device above the ground. If desirable to furnish additional support to the device, it is within the scope of the invention to provide an alternative or additional aperture through the faceplate for receiving alternative affixing means, such as a nail or tie wrap. Although it is contemplated that the device will be constructed of plastic for durability and flexibility, other materials can be used, consistent with the intended outdoor use of the device. Additionally, it is desirable to provide the faceplate and/or containers in various colors as it is known in the art of the affinity of certain insects to certain colors. Accordingly, reference should be made to the appended claims rather than the foregoing specification in assessing the scope of the invention in which exclusive rights are claimed.

We claim:

1. A surface area dispenser comprising:
   a one-piece faceplate having an affixing section and a dispensing section, said affixing section being defined by an affixing enclosure substantially disposed at an end of the faceplate and defined by an outermost member substantially defining a loop substantially lying on the same plane as said faceplate, said dispensing section having a hold therein;
   a container having an enclosed body with at least one open section; and,
   means for attaching said container to said faceplate wherein said open section of said container is substantially in alignment with said hold in said dispensing section.

2. The dispenser as recited in claim 1, wherein said means for attaching said container to said faceplate is by a form-fit between said container and said faceplate.

3. The dispenser as recited in claim 1, wherein said means for attaching said container to said faceplate is by a snap-fit between said container and said faceplate.

4. The dispenser as recited in claim 1, wherein said means for attaching said container to said faceplate is by a slide-fit between said container and said faceplate.

5. The dispenser recited in claim 3, wherein the hole in said dispensing section is at least partially encompassed by a raised edge, said raised edge having a top and a bottom, the bottom thickness of said edge being greater than the top thickness, thereby defining a faceplate lip, the container having a protrusion defining a container rim, wherein said snap-fit is made by engaging the faceplate lip with said container rim.

6. The dispenser recited in claim 1, wherein said outermost member is discontinuous, thereby defining a loop with a break.

7. The dispenser recited in claim 1, further comprising at least one stub projecting outward over said hole in said dispensing section.

8. The dispenser recited in claim 1, wherein the faceplate is essentially rectangular in shape.

9. The dispenser recited in claim 1, wherein the faceplate is essentially oval in shape.

10. The dispenser recited in claim 1, wherein the container is essentially cylindrical in shape.

11. The dispenser recited in claim 1, wherein the container is essentially rectangular in shape.

12. The dispenser recited in claim 1, wherein the container is essentially triangular in shape.

13. The dispenser recited in claim 1, wherein the container is essentially hemispherical in shape.

14. The dispenser recited in claim 1, wherein the container is essentially, conical in shape.

15. The dispenser recited in claim 1, wherein the container is essentially oviod in shape.

16. The dispenser recited in claim 1, wherein the dispensing section has a plurality of said holes therein for attaching a plurality of said containers in substantial alignment with said plurality of holes.

17. The dispenser recited in claim 1 further comprising at least one secondary aperture for introduction of alternate affixing means.

18. The dispenser recited in claim 1, wherein said faceplate and said container are constructed of plastic.

19. The dispenser recited in claim 16 further comprising at least one stub projecting outward over each of said plurality of holes.

20. A surface area dispenser comprising:
a faceplate having an affixing section and a dispensing section, said affixing section being defined by an affixing enclosure substantially disposed at an end of the faceplate and defined by an outermost member substantially defining a loop substantially lying on the same plane as said faceplate, said dispensing section having a hole therein; attachment means for attaching a container to said faceplate wherein a plurality of containers, each having an enclosed body with at least one open section attachable in substantial alignment with said hole in said dispensing section, are selectively, individually attachable, said containers varying in cross-sectional area.

21. The dispenser recited in claim 20, wherein the selectively, individually attachable containers vary in volume.

* * * * *